(12) United States Patent  (10) Patent No.: US 9,333,485 B1
Siriwardane  (45) Date of Patent: May 10, 2016

(54) PREPARATION OF SORBENT PELLETS WITH HIGH INTEGRITY FOR SORPTION OF $CO_2$ FROM GAS STREAMS

(71) Applicant: Ranjani V. Siriwardane, Morgantown, WV (US)

(72) Inventor: Ranjani V. Siriwardane, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/695,069

(22) Filed: Apr. 24, 2015

Related U.S. Application Data

(63) Continuation-in-part of application No. 13/867,192, filed on Apr. 22, 2013, now Pat. No. 9,079,160.

(51) Int. Cl.
| | |
|---|---|
| *B01J 20/30* | (2006.01) |
| *B01J 20/04* | (2006.01) |
| *B01J 20/06* | (2006.01) |
| *B01D 53/04* | (2006.01) |
| *B01D 53/52* | (2006.01) |
| *B01D 53/62* | (2006.01) |
| *B01J 20/32* | (2006.01) |
| *B01J 20/10* | (2006.01) |
| *B01J 20/22* | (2006.01) |
| *B01J 20/26* | (2006.01) |

(52) U.S. Cl.
CPC ............ *B01J 20/3287* (2013.01); *B01J 20/041* (2013.01); *B01J 20/043* (2013.01); *B01J 20/045* (2013.01); *B01J 20/048* (2013.01); *B01J 20/10* (2013.01); *B01J 20/22* (2013.01); *B01J 20/223* (2013.01); *B01J 20/26* (2013.01); *B01J 20/3042* (2013.01)

(58) Field of Classification Search
None
See application file for complete search history.

(56) References Cited

U.S. PATENT DOCUMENTS

| | | | | | |
|---|---|---|---|---|---|
| 3,065,054 | A | * | 11/1962 | Haden, Jr. ........... | C01B 33/2815 423/131 |
| 3,684,712 | A | * | 8/1972 | Bovard ................. | B01D 53/62 502/400 |
| 4,039,620 | A | * | 8/1977 | Netteland .............. | A62D 9/00 423/230 |
| 4,433,981 | A | * | 2/1984 | Slaugh .................. | B01J 20/041 95/139 |
| 4,810,266 | A | * | 3/1989 | Zinnen .................. | B01D 53/02 423/230 |
| 4,964,889 | A | * | 10/1990 | Chao .................... | B01D 53/02 423/239.1 |
| 5,087,597 | A | * | 2/1992 | Leal ..................... | B01J 20/12 502/401 |
| 5,214,019 | A | * | 5/1993 | Nalette ................. | B01D 53/62 423/230 |

(Continued)

*Primary Examiner* — Joseph D Anthony
(74) *Attorney, Agent, or Firm* — Jacob A. Heafner; Brian J. Lally; John T. Lucas

(57) ABSTRACT

Method for the production of a $CO_2$ sorbent prepared by integrating a clay substrate, basic alkali salt, amine liquid, hydraulic binder, and a liquid binder. The basic alkali salt is present relative to the clay substrate in a weight ratio of from about 1 part to about 50 parts per 100 parts of the clay substrate. The amine liquid is present relative to a clay-alkali combination in a weight ratio of from about 1 part to about 10 parts per 10 parts of the clay-alkali combination. The clay substrate and basic alkali salt may be combined in a solid-solid heterogeneous mixture and followed by introduction of the amine liquid. Alternatively, an alkaline solution may be blended with the amine solution prior to contacting the clay substrate. The clay-alkali-amine $CO_2$ sorbent is particularly advantageous for low temperature $CO_2$ removal cycles in a gas stream having a $CO_2$ concentration less than around 2000 ppm and an oxygen concentration around 21%, such as air.

13 Claims, 2 Drawing Sheets

(56) References Cited

U.S. PATENT DOCUMENTS

| | | | | |
|---|---|---|---|---|
| 5,231,063 A * | 7/1993 | Fukumoto | B01D 53/02 | 252/190 |
| 5,376,614 A * | 12/1994 | Birbara | B01D 53/02 | 252/190 |
| 5,480,625 A * | 1/1996 | Nalette | B01D 53/62 | 423/220 |
| 5,492,683 A * | 2/1996 | Birbara | B01D 53/02 | 423/228 |
| 5,876,488 A * | 3/1999 | Birbara | B01D 53/1475 | 422/178 |
| 5,917,136 A * | 6/1999 | Gaffney | B01D 53/02 | 95/104 |
| 6,280,503 B1 * | 8/2001 | Mayorga | B01D 53/02 | 95/104 |
| 6,322,612 B1 * | 11/2001 | Sircar | B01D 53/047 | 95/104 |
| 6,908,497 B1 * | 6/2005 | Sirwardane | B01D 53/02 | 423/230 |
| 7,045,483 B2 * | 5/2006 | Noda | B01D 53/9422 | 502/243 |
| 7,314,847 B1 * | 1/2008 | Siriwardane | B01J 20/10 | 423/230 |
| 9,138,683 B1 * | 9/2015 | Siriwardane | B01D 53/62 | |

\* cited by examiner

PREPARATION OF SORBENT PELLETS WITH HIGH INTEGRITY FOR SORPTION OF $CO_2$ FROM GAS STREAMS

RELATION TO OTHER APPLICATIONS

This patent application claims priority from nonprovisional patent application Ser. No. 13/867,192 filed Apr. 22, 2013, now U.S. Pat. No. 9,079,160 which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory, and pursuant to Contract Research and Development Agreement (CRADA) No. AGMT-0255.

FIELD OF THE INVENTION

One or more embodiments of the present invention relates to a method for the fabrication of a solid sorbent for the sorption of $CO_2$ from a gaseous stream, where the solid sorbent is comprised of a clay substrate, a basic alkali salt, an amine liquid, a binder, and a hydraulic binder.

BACKGROUND $CO_2$ absorption processes using aqueous amine solutions facilitate the removal of $CO_2$ from gas streams in many industries. A common process is known as wet chemical stripping where one or more reversible chemical reactions between $CO_2$ and amine substances produce liquid species, such as a carbamate. The conversion of carbamate back to $CO_2$ proceeds through a thermal regeneration process, typically at a temperature of about 120° C. As a result, the process is energy intensive. Additionally, the amine solution has a limited lifetime due to amine oxidation, and amine solutions may exacerbate corrosion problems of associated process equipment.

To mitigate these issues, solid sorbents serve as alternatives to wet chemical stripping via the formation of carbamate species. Important considerations include the ability to regenerate an absorbent and the ease of its regeneration, and multiple solid $CO_2$ sorbents exist. Efforts have been made to reversibly adsorb $CO_2$ on silica gel modified with amine. See U.S. Pat. No. 5,087,597 to Leal et al., issued Feb. 11, 1992. Methods have also been disclosed for incorporating liquid amines onto the surface of support substrates having relatively high surface areas. See U.S. Pat. Nos. 5,876,488 and 5,492,683 to Birbara et al., issued Mar. 2, 1999 and Feb. 20, 1996 respectively, and see U.S. Pat. No. 4,810,266 to Zinnen et al., issued Mar. 7, 1989. Amines have also been distributed within the interlayers of clay substrates. See U.S. Pat. No. 6,908,497 to Siriwardane, issued Jun. 21, 2005.

The effective lifetime of these solid sorbents is impacted by amine oxidation in environments where the oxygen concentration is substantial. The Interaction of amine with oxygen is known to degrade the amines. See e.g., Lepaumier et al., "New Amines for $CO_2$ Capture. II. Oxidative Degradation Mechanisms," *Industrial & Engineering Chemistry Research* 48(20) (2009), among others.

Since air contains 21% oxygen, air degradation is a significant concern. Correspondingly, it would be advantageous to provide a method for producing a solid sorbent offering increased resistance to oxygen degradation over those currently offered. Additionally, since the degradation mechanism with oxygen is reported to have acidic intermediates, it would be advantageous to provide a method by which the acidic intermediate formation could be minimized through inclusion of a relatively inexpensive material, such as an alkali.

Disclosed here is a method for the production of a $CO_2$ sorbent exhibiting an increased effective lifetime in environments having substantial oxygen concentrations. The method generates the $CO_2$ sorbent through integration of a clay substrate, a basic alkali salt, and an amine liquid, followed by incorporation of a liquid binder and a hydraulic binder. The clay substrate serves as a plurality of internally situated reaction sites while the basic alkali salt acts as a strong base to generate a high pH environment. The basic alkali salt greatly mitigates oxygen degradation of the amine and significantly prolongs the useful life of the clay-alkali-amine $CO_2$ sorbent. The clay-alkali-amine $CO_2$ sorbent produced is particularly effective for low temperature $CO_2$ removal cycles from air/$CO_2$ having a $CO_2$ concentration less than around 1% and an oxygen concentration around 21%.

These and other objects, aspects, and advantages of the present disclosure will become better understood with reference to the accompanying description and claims.

SUMMARY

The method disclosed provides for the production of a clay-alkali-amine $CO_2$ sorbent generated through the integration of a clay substrate, a basic alkali salt, an amine liquid, a hydraulic binder, and a liquid binder. The clay substrate generally serves as a plurality of internally situated reaction sites while the basic alkali salt acts as a strong base in order to generate a high pH environment. The effect of the basic alkali salt greatly mitigates oxygen degradation of the amine and significantly prolongs the useful life of the clay-alkali-amine $CO_2$ sorbent.

The clay-alkali-amine $CO_2$ sorbent is prepared by mixing the clay substrate, the basic alkali salt, and the amine liquid. The basic alkali salt is present relative to the clay substrate in a weight ratio of from about 1 part to about 50 parts per 100 parts of the clay substrate. The amine liquid is present relative to the clay-alkali combination in a weight ratio of from about 1 part to about 10 parts per 10 parts of the clay-alkali combination. The clay, alkali, and amine are blended to generate a clay-alkali-amine powder. The hydraulic binder is mixed with the clay-alkali-amine powder in a weight ratio of 0.5-25 parts per 62 parts of the clay-alkali-amine powder, then the powder-binder mixture is blended with the liquid binder using a weight ratio of from about 0.5-3 parts per 1 part of the hydraulic binder. The liquid binder has a melting point greater than about 50° C. and is supplied as a liquid. Following the blending, the $CO_2$ sorbent mixture is cooled to a temperature of less than 25° C. to generate the $CO_2$ sorbent. The $CO_2$ sorbent mixture is generally a plurality of $CO_2$ sorbent pellets, typically having a mean diameter less than about 30 mm.

The clay substrate is an aluminum phyllosilicate having a layered structure expanded by polar molecules. The cation of the basic alkali salt is comprised of Na, K, Li, Rb, Cs, Ca, Ba, or Sr and the anion could be a hydroxide, carbonate, acetate, phosphate, or oxide. The liquid amine is comprised of a primary amine, a secondary amine, a tertiary amine, an aromatic amine, a cyclic amine or combinations thereof. In an embodiment, the clay substrate is bentonite, the basic alkali salt is NaOH or $Na_2CO_3$, and the amine liquid is a diethanolamine (DEA) solution. The hydraulic binder is a material which hardens by hydration reactions and forms a generally water-resistant product. In certain embodiments, the hydraulic binder comprises Portland cement, a material comprising calcium sulfate such as DRIERITE, and/or a material comprising calcium aluminate, calcium silicates, or a combination. The liquid binder is a material which has a melting point of at least 50° C. and typically has a polar functional group capable of associating with water, such as an amino or hydroxy group. In certain embodiment, the liquid binder comprises ethylene glycol, diethylene glycol, propylene glycol, 1,3-propane diol, glycerol monoacetate and diacetate, ethyl glycolate, and mono- and di-ethanol amines.

In a particular embodiment, the clay substrate is supplied as a plurality of clay substrate granules and the basic alkali salt is supplied as a plurality of basic alkali salt granules, and the clay-alkali-amine $CO_2$ sorbent is produced by initially generating a solid-solid heterogeneous mixture of the clay substrate and the basic alkali salt. A limited quantity of liquid such as water may be added to the solid-solid heterogeneous mixture in order to form porous clay-alkali pellets. The solid-solid heterogeneous mixture is then combined with the amine liquid to produce the clay-alkali-amine powder, and the hydraulic binder and liquid binder are utilized as before.

In another embodiment, the clay substrate is supplied as a plurality of porous clay particles and the basic alkali salt is supplied as an alkali solution. In this embodiment, an amine-alkali liquid is generated by blending the liquid amine, the alkali solution, and a solvent. The porous clay particles are contacted with the amine-alkali liquid, allowing the amine-alkali liquid to penetrate the porous clay pellets and generate the clay-alkali-amine powder. The resulting clay-alkali-amine powder, the hydraulic binder, and liquid binder are utilized as before.

The clay-alkali-amine $CO_2$ sorbent produced by the disclosed method is particularly advantageous for low temperature $CO_2$ removal cycles where $CO_2$ is present at ppm levels and where oxygen concentrations are increased. For example, the clay-alkali-amine sorbent produced is particularly useful for low temperature $CO_2$ removal cycles when the gas stream is air/$CO_2$, having a $CO_2$ concentration less than around 2000 ppm and an oxygen concentration generally around 21%.

The novel process and principles of operation are further discussed in the following description.

DETAILED DESCRIPTION

Figure 2:
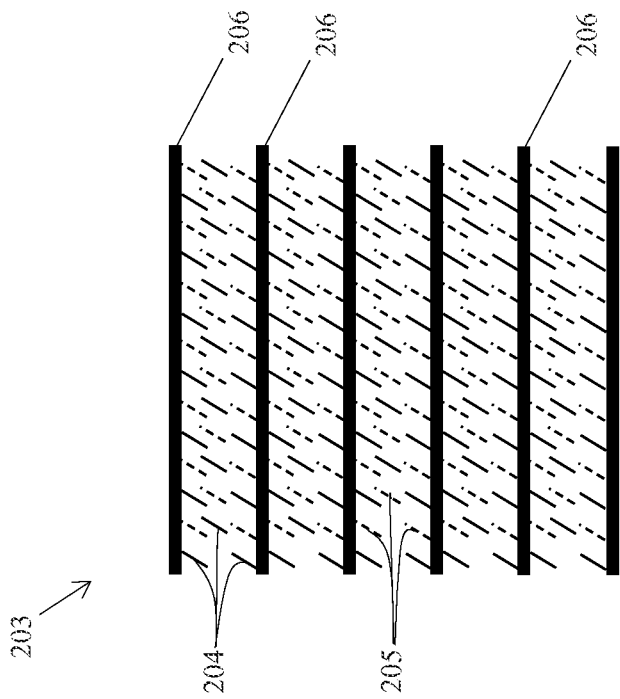
FIG. 2 illustrates interlayers of the clay-alkali-amine $CO_2$ sorbent.

The following description is provided to enable any person skilled in the art to use the invention and sets forth the best mode contemplated by the inventor for carrying out the invention. Various modifications, however, remain readily apparent to those skilled in the art, since the principles of the present invention are defined herein specifically to provide a method for the production of a $CO_2$ sorbent through the integration of a clay substrate, a basic alkali salt, and an amine liquid, followed by incorporation of a hydraulic binder and a liquid binder.

The method disclosed provides for the production of a $CO_2$ sorbent comprised of a clay substrate, a basic alkali salt, an amine liquid, a hydraulic binder, and a liquid binder. The $CO_2$ sorbent may be utilized for the capture of $CO_2$ from a gas stream. The clay substrate generally serves as a plurality of internally situated reaction sites to facilitate reaction of the amines in the amine liquid with $CO_2$, and the basic alkali salt acts as a strong base which possibly absorbs $H_2O$ from the gas stream and generates a high pH environment. The effect of the basic alkali salt tends to greatly mitigate oxygen degradation of the amine and significantly prolong the useful life of the $CO_2$ sorbent. The $CO_2$ sorbent produced is particularly advantageous for low temperature $CO_2$ removal cycles where $CO_2$ is present at ppm levels and where oxygen concentrations are increased. For example, the $CO_2$ sorbent produced is particularly useful for low temperature $CO_2$ removal cycles when the gas stream is air, having a $CO_2$ concentration less than around 2000 ppm and an oxygen concentration generally around 21%.

The $CO_2$ sorbent is prepared by initially mixing the clay substrate, the basic alkali salt, and the amine liquid. The basic alkali salt is present relative to the clay substrate in a weight ratio of from about 1 part to about 50 parts per 100 parts of the clay substrate. The amine liquid is present relative to the clay-alkali combination in a weight ratio of from about 1 part to about 10 parts per 10 parts of the clay-alkali combination. The clay substrate, the basic alkali salt, and the amine liquid are integrated to produce a clay-alkali-amine powder. Subsequently, the clay-alkali-amine powder is mixed with a hydraulic binder to form a powder-binder mixture. In the powder-binder mixture, the hydraulic binder is present relative to the clay-alkali-amine powder in a weight ratio of from about 0.5 to about 25 parts per 62 parts of the clay-alkali-amine powder. The powder-binder mixture is then blended with a liquid binder supplied in a weight ratio of from about 0.5 to about 3 parts per 1 part of the hydraulic binder present in the powder-binder mixture to generate a $CO_2$ sorbent mixture, generally in the form of pellets. The liquid binder has a melting point greater than about 50° C. and is supplied as a liquid. Following the blending, the $CO_2$ sorbent pellets are cooled to a temperature of less than 25° C. to generate the $CO_2$ sorbent.

Figure 1:
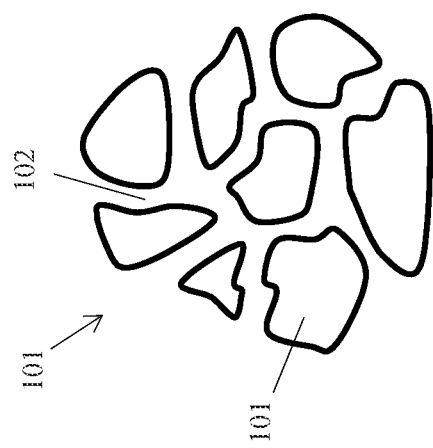
FIG. 1 illustrates the clay-alkali-amine $CO_2$ sorbent in the form of a pellet.

A portion of the $CO_2$ sorbent is generally illustrated at FIG. 1. At FIG. 1, sorbent portion 101 is comprised of a clay substrate, basic alkali salt, and an amine liquid. Additionally, pores 102 are physically interconnected throughout sorbent portion 101 to create conduits within sorbent portion 101. Thus fluids within an atmosphere surrounding sorbent portion 101 can diffuse into the pores 102 to interact with and be reversibly bound to the amine comprising the amine liquid.

A substantial portion of the amines and basic alkali salt within the clay-alkali-amine combination is encapsulated between expanded interlayers of the clay substrate. As is understood, polar liquids can enter between interlayers of certain substrates causing the lattice structure of the substrate to expand. One suitable substrate is bentonite, an inert mineral alumino-silicate whose main constituent is montmorillinite comprised of continuous layers of alumino-silicate sheets. The c-axis's dimension Γ of the montmorillinite in bentonite may expand from 9.6 angstrom to an almost complete separation in the presence of polar liquids. See e.g., U.S. Pat. No. 6,908,497 to Siriwardane, issued Jun. 21, 2005, among others.

FIG. 2 illustrates a portion of the $CO_2$ sorbent generally at 203, with amines 204 and basic alkali salts 205 encapsulated between interlayers 206 of the clay substrate. The $CO_2$ to be absorbed by $CO_2$ sorbent 203 is captured between the interlayers 206 by reaction or dissolution in the amines 204. Additionally, the basic alkali salts 205 possibly absorb $H_2O$ generating a high pH environment, greatly mitigate oxygen degradation of the amine from any oxygen within the surrounding atmosphere, and significantly prolonging the useful life of the $CO_2$ sorbent. There are pores 207 within each particle and pores 102 exist between the particles agglomerated to define $CO_2$ sorbent 203. Pores additionally exist at the external surface of the $CO_2$ sorbent when pelletized to facilitate physical and chemical communication between the interior of a $CO_2$ sorbent pellet and the atmosphere surrounding the pellet.

The process for producing the clay-alkali-amine $CO_2$ sorbent is generally comprised of supplying a clay substrate, a basic alkali salt, and an amine liquid. The basic alkali salt is supplied relative to the clay substrate in a weight ratio of from about 1 part to about 50 parts per 100 parts of the clay substrate. In an embodiment, the clay substrate is supplied at 0.5 parts to about 5 parts per 15 parts of the clay substrate. The amine liquid is supplied relative to a clay-alkali-amine combination in a weight ratio of from about 1 part to about 10 parts per 10 parts of the clay-alkali combination. The clay substrate, basic alkali salt, and amine liquid in the supplied quantities are integrated to produce a clay-alkali-amine powder. Subsequently, the clay-alkali-amine powder is mixed with a hydraulic binder to form a powder-binder mixture, and the powder-binder mixture is blended with a liquid binder. The hydraulic binder is present relative to the clay-alkali-amine powder in a weight ratio of from about 0.5 to about 25 parts per 62 parts of the clay-alkali-amine powder, and the liquid binder is present in a weight ratio of from about 0.5 to about 3 parts per 1 part of the hydraulic binder. Additionally, the liquid binder is a material having a melting temperature of at least 50° C., and is added to the powder-binder mixture as a liquid. Following addition of the liquid binder, the $CO_2$ sorbent mixture is cooled to a temperature of less than 25° C. to generate the $CO_2$ sorbent.

Within this disclosure, the basic alkali salt is comprised of a metallic cation and an anion, where the metallic cation is Na, K, Li, Rb, Cs, Ca, Ba, or Sr and where the anion is hydroxide ion, a carbonate ion, an acetate ion, a phosphate ion, or an oxide ion. Similarly, the second basic alkali salt when utilized may be comprised of a Na, K, Li, Rb, Cs, Ca, Ba, or Sr metallic cations and a hydroxide, carbonate, phosphate, acetate or oxide anions. In a particular embodiment the metallic cation is Na and the anion is a hydroxide or carbonate.

The basic alkali salt is a salt which can be formed by an anion derived from a weak acid and a cation derived from a strong base. As is understood, a weak acid is an acid which fails to ionize fully when dissolved in water. In an embodiment, the anion of the basic alkali salt is derived from a weak acid, where the weak acid has a $pk_a$ greater than or equal to −2. See e.g., W. M. Haynes, *CRC Handbook of Chemistry and Physics* ($92^{nd}$ Ed. 2012), among others. Additionally, in an embodiment, the basic alkali salt is comprised of at least 90% by weight of a basic alkali compound consisting of an alkali cation and an alkali anion, where the alkali cation is from the group consisting of Na, K, Li, Rb, Cs, Ca, Ba, Sr, and mixtures thereof, and the alkali anion is from the group consisting of a hydroxide ion, a carbonate ion, an acetate ion, a phosphate ion, an oxide ion, or mixtures thereof.

The clay substrate is an aluminum phyllosilicate comprised of a layered structure which can expand to allow polar molecules to reside therein. In a particular embodiment, the clay substrate is comprised of bentonite, however clays other than bentonite can be used, including but not limited to ball clay, fuller's earth, kaolin, attapulgite, hectorite, meerschaum, palygorskite, saponite, sepiaolite, common clay, and fire clay. Some clays may swell more than others, thus having greater absorption capacities. Some clays may be able to contain or otherwise accommodate a greater volume of polar liquids than others. Typically the aluminum phyllosilicate is a hydrous aluminum phyllosilicate.

The liquid amine is liquid comprised of an amine, where the amine is a primary amine, a secondary amine, a tertiary amine, an aromatic amine, a cyclic amine or combinations thereof. The amine may contain one or more moieties such as methyl, ethyl, n-propyl, isopropyl, n-butyl, isobutyl, t-butyl, allyl, vinyl, cyclopentyl, cyclohexyl, phenyl, naphthyl, ethylene glycol, polyethylene glycol, and combinations thereof. Moieties attached to an amine nitrogen may contain one or more hydroxyl moieties attached to one or more moiety carbon atoms. In an embodiment, the amine comprises at least 90% of the liquid amine by mass. In a further embodiment, the amine comprises at least 99% of the liquid amine by mass.

The hydraulic binder is a material which hardens by hydration reactions and forms a generally water-resistant product. In some embodiments, hydraulic binder refers to a hydraulic cement as described within ASTM Cement C 1157, *Standard Performance Specification for Hydraulic Cement*. In other embodiments, the hydraulic binder comprises hydraulic calcium silicates, or calcium sulfate. In certain embodiments, the hydraulic binder comprises Portland cement, a material comprising calcium sulfate such as DRIERITE, and/or a material comprising calcium aluminate, calcium silicates, or a combination.

The liquid binder is a material which has a melting point of at least 50° C. The liquid binder is typically a solid at a temperature of 25° C. Generally, the liquid binder has at least one polar functional group capable of associating with water, such as an amino or hydroxy group. In an embodiment, the liquid binder comprises ethylene glycol, diethylene glycol, propylene glycol, 1,3-propane diol, glycerol monoacetate and diacetate, ethyl glycolate, and mono- and di-ethanol amines. In an embodiment, the liquid binder comprises a polyethylene glycol (PEG), such as PEG 3350 or PEG 8000. In an embodiment, the liquid binder is added to the powder-binder mixture drop-wise.

The clay-alkali-amine powder may be generated using any appropriate methodology, including those methodologies disclosed in co-pending U.S. patent application Ser. No. 13/867,192 by Siriwardane et al. In a particular embodiment, the clay-alkali-amine powder is produced by generating a solid-solid heterogeneous mixture of the clay substrate and the basic alkali salt. In this particular embodiment, the clay substrate is supplied as a plurality of clay substrate granules, and the basic alkali salt is supplied as a plurality of basic alkali salt granules. Typically, a mean diameter of both the clay substrate granules and the basic alkali salt granules is less than about 500 micron, more typically less than 100 micron. Additionally, the clay substrate particles may have a limited water content, for example less than about 15% by mass. In this embodiment, the clay substrate, basic alkali salt, and amine liquid are integrated by first mixing the clay substrate granules and the basic alkali salt granules to generate the solid-solid heterogeneous mixture, which is then combined with the amine liquid to produce the clay-alkali-amine powder.

The clay substrate granules and the basic alkali salt granules may be mixed into the solid-solid heterogeneous mixture using any means known in the art. Various mixer types may be employed, for example those types typically referred to a static mixers, shaker-mixers, V-blenders, and others. Any means by which the basic alkali salt may be dispersed among the clay substrate particles is sufficient. Combination and mixing of the clay substrate granules and the basic alkali salt granules is typically conducted until the basic alkali salt particulates are substantially randomly dispersed within the clay substrate particles. Sufficient homogeneity of the solid-solid heterogeneous mixture can typically be gauged by those skilled in the art. In an embodiment, sufficient mixing was achieved using a 10 liter capacity EIRICH intensive mixer on slow speed for about 15-20 minutes. In an additional embodiment, the solid-solid heterogeneous mixture has a Lacey mixing index greater than 0.5 based on the proportion of the basic alkali salt. See e.g., Tasirin et al., "Mixing Process of Binary Polymer Particles in Different Type of Mixers," Modern Applied Science 3(6) (2009) and incorporated references, among many others. The solid-solid heterogeneous mixture is then combined with the amine liquid.

In a further embodiment, an alkaline solution is additionally added to the amine liquid, where the alkaline solution is comprised of a second basic alkali salt. The second basic alkali salt may have the same chemical composition as the initial basic alkali salt supplied, though this is not required. In this embodiment when the alkaline solution is utilized, the mass of the second basic alkali salt comprising the alkaline solution is less than about 30% of the mass of the amine comprising the amine liquid.

In a second particular embodiment, the basic alkali salt is supplied relative to the clay substrate in a weight ratio of from about 1 part to about 50 parts per 100 parts of the clay substrate and the amine liquid is supplied relative to a clay-alkali combination at from about 1 part to about 10 parts per 10 parts of the clay-alkali combination as before. In this particular embodiment, the clay substrate is a plurality of porous clay particles, where a porous clay particle contains physically interconnected pores which create conduits within the porous clay particle, and where at least some portion of the interconnected pores are in fluid communication with an atmosphere surrounding the porous clay particle. Further, in this particular embodiment, the basic alkali salt is in the form of an alkali solution comprised of the basic alkali salt, where the mass of the basic alkali salt comprising the alkali solution is less than about 30% of the mass of the amine comprising the amine liquid. Here, integrating the clay substrate, the basic alkali salt, and the amine liquid is comprised of initially generating an amine-alkali liquid by blending the liquid amine, the alkali solution, and a solvent, where the basic alkali salt is soluble in the solvent and where the solvent is soluble in the amine. The plurality of porous clay particles is then contacted with the amine-alkali liquid by stirring and/or coating the plurality of porous clay particles with the amine-alkali liquid and allowing at least some portion of the amine-alkali liquid to penetrate the interconnected pores of the porous clay particles, thereby generating the clay-alkali-amine powder.

Typically, the plurality of porous clay particles has a mean diameter of less than about 500 micron, more typically less than 100 micron. Within this disclosure, the term "mean diameter" when referring to clay substrate granules, basic alkali salt granules, or a plurality of porous clay particles means an equivalent spherical diameter such as a Sauter mean diameter determined by means known in the art such as sieving, microscopy, sedimentation, permeametry, laser diffraction, or other means, or as reported by a manufacturer. See e.g., Martin Rhodes, *Introduction to Particle Technology* ($2^{nd}$ ed. 2008).

Clay substrates, basic alkali salts, liquid amines, and alkaline solutions as described within the various embodiments herein are commercially available from manufacturers such as, for example, Sigma-Aldrich Co. LLC, St. Louis, Mo., among others.

The clay-alkali-amine $CO_2$ sorbent produced using the methods disclosed is particularly suitable for the absorption of $CO_2$ from a gas stream when the gas stream contains a low concentration of $CO_2$ and is additionally comprised of moisture and relatively high oxygen concentrations, for example, around 21%. The clay-alkali-amine $CO_2$ sorbent may be utilized for sorption in a temperature range or around 25° C. to about 60° C., and may be regenerated at temperatures below around 80° C. In this environment, the clay-alkali-amine $CO_2$ sorbent exhibits stable reactivity and appears to greatly mitigate the impact of oxygen degradation of the encapsulated amine, as compared to other clay-amine sorbents prepared without the basic alkali salt as described.

Selected $CO_2$ Sorbent Demonstrations:

Selected $CO_2$ sorbents prepared by the methods disclosed herein at listed at Tables 1 and 2. Additionally, embodiments of the $CO_2$ sorbents at Table 2 were tested using with fixed bed reactor $CO_2$ sorption tests. The fixed bed reactor $CO_2$ sorption tests were conducted with 1050 ppm $CO_2$/air mixture at 25° C. Regeneration was conducted at 50° C. with $N_2$. $CO_2$ capture capacities for the $CO_2$ sorbents tested are reported at Table 2. The $CO_2$ capture capacities reported in Table 2 are for the breakthrough times of 400 ppm.

Figure 3:
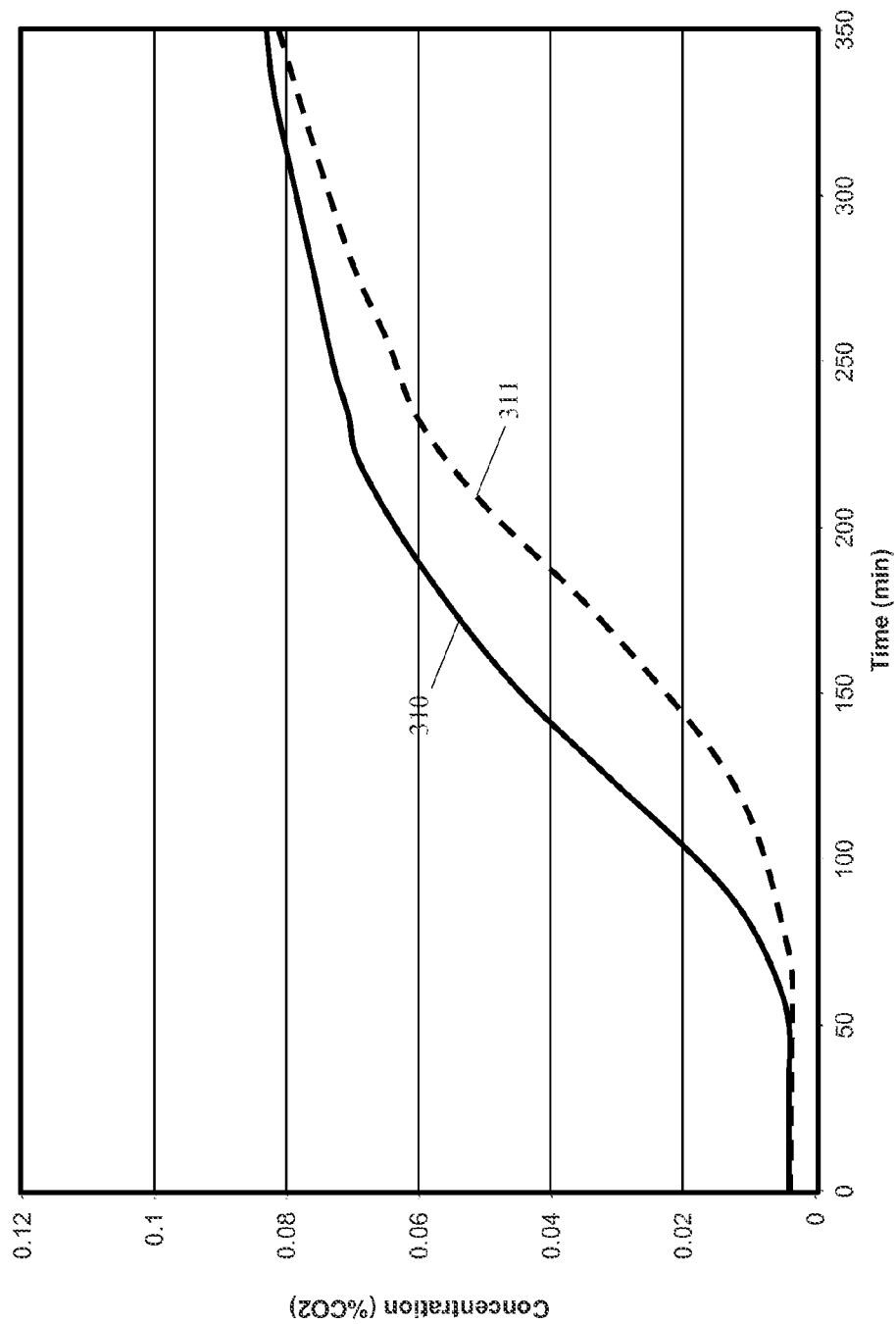
FIG. 3 illustrates the performance of the $CO_2$ sorbent.

Additionally, sorption data is illustrated at FIG. 3 showing concentration profiles during fixed bed flow reactor tests for sorption of $CO_2$ at 25° C. and 1 atm (1050 PPM $CO_2$, 21% $O_2$, Balance $N_2$, 3% moisture) at 50 sccm. At FIG. 3, 310 illustrates the performance of a $CO_2$ sorbent comprising a hydraulic binder of DRIERITE and a liquid binder of PEG, with the hydraulic binder and PEG present in generally a 1:1 ratio. Similarly, 311 illustrates the performance of a $CO_2$ sorbent comprising DRIERITE and PEG, with the hydraulic binder and the PEG present in generally a 8:5 ratio.

Thus disclosed here is a method for the production of a clay-alkali-amine $CO_2$ sorbent comprised of a clay substrate, a basic alkali salt, an amine liquid, a hydraulic binder, and a liquid binder for the capture of $CO_2$ from a gas stream. The clay substrate serves as a plurality of internally situated reaction sites facilitating reaction of the amines with $CO_2$, and the basic alkali salt acts as a strong base possibly absorbing $H_2O$ to generate a high pH environment. The basic alkali salt greatly mitigates oxygen degradation of the amine and significantly prolongs the useful life of the $CO_2$ sorbent. The $CO_2$ sorbent produced is particularly advantageous for low temperature $CO_2$ removal cycles where $CO_2$ is present at ppm levels and where oxygen concentrations are increased, such as low temperature $CO_2$ removal cycles from air having a $CO_2$ concentration less than around 2000 ppm and an oxygen concentration around 21%.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Composition and performance data of selected CO$_2$ sorbents

| Liquid Binder | Hydraulic Binder | Weight ratio Clay-Alkali-Amine powder:Liquid Binder:Hydraulic Binder | TGA Cyclic Capacity at 25-60° C. (g/kg) |
|---|---|---|---|
| PEG 3350 | DRIERITE | 62:15:15 | 9.9 |
| PEG 3350 | DRIERITE | 62:20:25 | 5:7 |
| PEG 3350 | Portland Cement | 62:18:18 | 4.9 |

TABLE 2

Composition and performance data of additional CO$_2$ sorbents

| Liquid Binder | Hydraulic Binder | Weight ratio Clay-Alkali-Amine powder:Liquid Binder:Hydraulic Binder | Capacity at 25-50° C. (moles/kg) Fixed bed reactor cycle2:Breakthrough 400 ppm |
|---|---|---|---|
| PEG 3350 | DRIERITE | 62:15:15 | 0.33 |
| PEG 3350 | DRIERITE | 62:8:8 | 0.38 |
| PEG 8000 | DRIERITE | 62:8:8 | 0.39 |
| PEG 8000 | DRIERITE | 62:5:8 | 0.45 |

What is claimed is:

1. A method of making a CO$_2$ sorbent comprising:
supplying a clay substrate;
supplying a basic alkali salt, where the basic alkali salt is supplied at from about 1 part to about 50 parts per 100 parts of the clay substrate by weight;
supplying an amine liquid comprised of an amine, where the amine liquid is supplied at from about 1 part to about 10 parts per 10 parts of a clay-alkali combination by weight, where the clay-alkali combination is a combined proportion of the clay substrate and the basic alkali salt;
integrating the clay substrate, the basic alkali salt, and the amine liquid, thereby producing a clay-alkali-amine powder;
supplying a hydraulic binder, where the hydraulic binder is supplied at from about 0.5 parts to about 25 parts per 62 parts of the clay-alkali-amine powder;
mixing the clay-alkali-amine powder and the hydraulic binder, thereby producing a powder-binder mixture;
supplying a liquid binder where the liquid binder has a melting temperature of at least 50° C. and where the liquid binder has a temperature of at least 50° C., where the liquid binder is supplied at from about 0.5 part to about 3 parts per 1 part of the hydraulic binder;
blending the liquid binder and the powder-binder mixture, thereby producing CO$_2$ sorbent pellets; and
cooling the CO$_2$ sorbent pellets to a temperature of less than 25° C., thereby generating the CO$_2$ sorbent.

2. The method of claim 1 where the liquid binder comprises an amino or hydroxy group.

3. The method of claim 2 where the liquid binder comprises ethylene glycol, diethylene glycol, propylene glycol, 1,3-propane diol, glycerol monoacetate, ethyl glycolate, mono- and di-ethanol amines, or combinations thereof.

4. The method of claim 1 where the hydraulic binder comprises calcium sulfate, calcium aluminate, calcium silicate, or mixtures thereof.

5. The method of claim 1 where the clay substrate is a plurality of clay substrate granules and where the basic alkali salt is a plurality of basic alkali salt granules, and where the integrating step comprises:
mixing the plurality of basic alkali salt granules and the plurality of clay substrate granules, thereby generating a solid-solid heterogeneous mixture; and
combining the solid-solid heterogeneous mixture and the amine liquid, thereby producing the clay-alkali-amine powder.

6. The method of claim 5 where the plurality of clay substrate granules and the plurality of basic alkali salt granules has a mean diameter of less than 500 micron.

7. The method of claim 1 further comprised of adding an alkaline solution to the amine liquid, where the alkaline solution is comprised of a second basic alkali salt.

8. The method of claim 1 where the basic alkali salt is comprised of a metallic cation and an anion, where the metallic cation is Na, K, Li, Rb, Cs, Ca, Ba, or Sr and where the anion is hydroxide ion, a carbonate ion, a acetate ion, a phosphate ion, or an oxide.

9. The method of claim 8 where the metallic cation is Na and the anion is the carbonate ion, and further comprised of adding an alkaline solution to the amine liquid, where the alkaline solution is comprised of a second basic alkali salt, where the second basic alkali salt is comprised of Na, and where a mass of the second basic alkali salt comprising the alkaline solution is less than about 30% of the mass of the amine comprising the amine liquid.

10. The method of claim 1 where the clay substrate is a plurality of porous clay particles, and where the basic alkali salt is an alkali solution comprised of the basic alkali salt, and where a mass of the basic alkali salt comprising the alkali solution is less than about 30% of the mass of the amine comprising the amine liquid, and where the integrating step is comprised of:
blending the liquid amine, the alkali solution, and a solvent, where the basic alkali salt is soluble in the solvent, and where the solvent is soluble in the amine, thereby generating an amine-alkali liquid;
contacting the plurality of porous clay particles and the amine-alkali liquid and allowing at least a portion of the amine alkali liquid to impregnate at least a portion of the plurality of porous clay particles, thereby producing the clay-alkali-amine powder.

11. The method of claim 10 where the basic alkali salt is comprised of a metallic cation and an anion, where the metallic cation is Na, K, Li, Rb, Cs, Ca, Ba, or Sr and where the anion is hydroxide ion, a carbonate ion, a acetate ion, a phosphate ion, or an oxide ion.

12. The method of claim 11 where the metallic cation is Na and the anion is the carbonate ion.

13. The method of claim 11 where the plurality of porous clay particles has a mean diameter of less than 500 micron.

* * * * *